Feb. 10, 1925.

J. I. PADGETT 1,525,882

ENGINE ATTACHMENT

Filed July 14, 1924

J. I. Padgett
INVENTOR

BY Victor J. Evans
ATTORNEY

WITNESS:

Patented Feb. 10, 1925.

1,525,882

UNITED STATES PATENT OFFICE.

JOSEPH I. PADGETT, OF JACKSONVILLE, FLORIDA.

ENGINE ATTACHMENT.

Application filed July 14, 1924. Serial No. 726,009.

*To all whom it may concern:*

Be it known that I, JOSEPH I. PADGETT, a citizen of the United States, residing at Jacksonville, in the county of Duval and State of Florida, have invented new and useful Improvements in Engine Attachments, of which the following is a specification.

My present invention has reference to a means for heating the vaporized gas between the carbureter and the intake manifold of an automobile engine, and for likewise introducing the vapors from the breather pipe providing the oil inlet for the engine, causing the same to mix with the vaporized gases to produce a better combustion as well as protecting the connecting rods and crank shaft bearings by the suction of oil to the front of the motor, and likewise to reduce the consumption of gasoline in running the motor.

With the above broadly stated objects in view, and others which will appear as the nature of the invention is better understood, reference is to be had to the drawing which accompanies and which forms part of this application.

In the drawing:—

Figure 1 is a side elevation of an automobile engine, illustrating the application of my improvement thereon.

Figure 2 is a sectional view on the line 2—2 of Figure 1.

Figure 3 is a sectional view approximately on the line 3—3 of Figure 1.

Figure 4 is a sectional view approximately on the line 4—4 of Figure 1.

In the drawing, the engine block is indicated by the numeral 1, the intake manifold by the numeral 2, the carbureter connected therewith by the numeral 3 and the exhaust manifold by the numeral 4.

Hung on the top of the exhaust manifold 4 there is the rounded or lipped end 5 of a hollow metal member 6. The member 6 is in the nature of a pipe, but has its inner and outer sides straight and rounded inwardly, whereby the inner side will partly underlie the exhaust manifold 4. For distinction, this wall is indicated by the numeral 7. The end of the pipe-like member 6 disposed nearest the front of the engine block is closed but is provided with a restricted air inlet opening 8. The opposite end of the pipe-like member is reduced and is threaded, the said threads being engaged by a coupling nut 9 which attaches the rounded upper end of a tubular pipe 10 thereto. The pipe 10 is extended to within the breather tube 11 that forms the oil inlet of the engine. The diameter of the pipe 10 is less than that of the breather pipe so that oil may be poured into the engine without removing the pipe 10 therefrom. The breather pipe is normally closed by a flanged cover 12 which is preferably slidably received on the pipe 11, although the same may be screwed thereto, if desired.

The pipe-like member 6 is approximately centrally formed with a depending hollow branch 13 having its lower end rounded below and toward the carbureter, as at 14. On this end there is screwed a coupling nut 15 connected with a short pipe 16 formed on one end of a metal box 17 that receives the bottom of the carbureter therein. The second end of the box member 17 is provided with a U-bend pipe extension 18 which is connected to the end of the carbureter to which the hot air stove is usually fixed. The hot air stove, it will be noted, is dispensed with.

Preferably the pipe 10 is in the nature of a flexible element so that the same can be withdrawn from the breather tube 11 should it be found necessary for the proper insertion of oil into the engine. With my improvement, it will be apparent that the gasoline in the carbureter will be effectively heated and the suction of the engine pistons will draw the vapor from the oil through the breather pipe into the pipe member 6 where the same will be again heated and directed through the branch 13, box 17 and pipe 18 into the carbureter to mix with the gasoline therein. Also the improvement protects the connecting rod and crank shaft bearings by the suction of oil to the front of the motor and atmospheric air is admitted through the port 8. The result is a far better combustion than is ordinarily obtained, with the reduction of gasoline and oil consumption.

Having described the invention, I claim:—

1. In combination with an automobile engine, including the carbureter therefor, of a pipe-like member having a lip hung on the exhaust manifold of the engine, a flexible pipe connection between one end of the said member and the breather tube of the engine, a slidable cap on the last mentioned pipe for covering the breather tube, said pipe-like member having a central depending branch terminating in an offset end, a box-like member secured to the end and in which the bottom of the carbureter is received, and a rounded pipe connection between the box-like member and the air inlet end of the carbureter.

2. A device for the purpose set forth and in combination with an automobile engine including the carbureter therefor, comprising a hollow member having a rounded inwardly directed lip arranged over the top of the exhaust manifold of the engine, said hollow member having its rear end provided with an air inlet port and its forward end reduced, a flexible pipe removably connected with the last mentioned end of the hollow member, said flexible pipe being received in the breather tube of the automobile, a flanged cap through which the flexible pipe passes for covering the breather tube, said hollow member having a central depending branch whose end is rounded toward the carbureter, a box-like member in which the bottom of the carbureter is received having its ends provided with pipe extensions, one of which being coupled to the angle end of the extension of the hollow member and the other being rounded and received in the air inlet end of the carbureter.

In testimony whereof I affix my signature.

JOSEPH I. PADGETT.